US009487202B2

(12) United States Patent
Ishida

(10) Patent No.: US 9,487,202 B2
(45) Date of Patent: Nov. 8, 2016

(54) FLUID-PRESSURE BRAKE DEVICE FOR VEHICLE

(71) Applicant: Satoshi Ishida, Chiryu (JP)

(72) Inventor: Satoshi Ishida, Chiryu (JP)

(73) Assignee: ADVICS CO., LTD., Kariya-Shi, Aichi-Ken (JP)

( * ) Notice: Subject to any disclaimer, the term of this patent is extended or adjusted under 35 U.S.C. 154(b) by 0 days.

(21) Appl. No.: 14/767,254

(22) PCT Filed: Feb. 12, 2014

(86) PCT No.: PCT/JP2014/053147
§ 371 (c)(1),
(2) Date: Aug. 11, 2015

(87) PCT Pub. No.: WO2014/126085
PCT Pub. Date: Aug. 21, 2014

(65) Prior Publication Data
US 2015/0375730 A1 Dec. 31, 2015

(30) Foreign Application Priority Data
Feb. 12, 2013 (JP) ................. 2013-024412

(51) Int. Cl.
*B60T 7/00* (2006.01)
*B60T 15/02* (2006.01)
(Continued)

(52) U.S. Cl.
CPC .............. *B60T 15/028* (2013.01); *B60T 7/042* (2013.01); *B60T 8/4077* (2013.01); *B60T 8/885* (2013.01); *B60T 11/165* (2013.01); *B60T 11/28* (2013.01); *B60T 13/166* (2013.01); *B60T 13/662* (2013.01); *B60T 13/686* (2013.01); *B60T 17/02* (2013.01)

(58) Field of Classification Search
CPC ............ B60T 8/17; B60T 8/171; B60T 8/40; B60T 8/4077; B60T 8/885; B60T 13/14; B60T 13/68; B60T 13/686; B60T 13/745; B60T 13/166; B60T 13/662; B60T 15/025; B60T 15/028; B60T 11/165; B60T 11/28; B60T 17/02; B60T 7/042
USPC .......... 303/3, 10, 15, 20, 199, DIG. 2, 114.1
See application file for complete search history.

(56) References Cited

U.S. PATENT DOCUMENTS

2002/0140283 A1* 10/2002 Kusano ................. B60T 8/4845
 303/114.1
2006/0158026 A1* 7/2006 Aoki ..................... B60T 13/145
 303/114.1
(Continued)

FOREIGN PATENT DOCUMENTS

DE 4 327 206 A1 2/1995
JP 2010-926 A 1/2010
(Continued)

OTHER PUBLICATIONS

International Search Report (PCT/ISA/210) mailed on May 20, 2014, by the Japanese Patent Office as the International Searching Authority for International Application No. PCT/JP2014/053147.

*Primary Examiner* — Melody Burch
(74) *Attorney, Agent, or Firm* — Buchanan Ingersoll & Rooney PC

(57) ABSTRACT

A fluid-pressure brake device for a vehicle includes a brake operation member, a master cylinder, wheel cylinders a fluid-pressure control actuator, a fluid-pressure control circuit, and an electric control unit. Moreover, in the fluid-pressure brake device for a vehicle, normally closed electromagnetic open/close valves are interposed on paths for connecting master system fluid-pressure circuits and a drive fluid chamber of the master cylinder with each other, the master system fluid-pressure circuits being configured to connect pressure chambers of the master cylinder and pressure chambers of the wheel cylinders—with each other. The fluid-pressure brake device for a vehicle is configured so that the electromagnetic open/close valves are opened when an action amount of the brake operation member is equal to or more than a set value. As a result, a size and a stroke of each of master pistons in the master cylinder can be reduced.

2 Claims, 11 Drawing Sheets

(51) Int. Cl.
- *B60T 8/40* (2006.01)
- *B60T 7/04* (2006.01)
- *B60T 13/16* (2006.01)
- *B60T 13/66* (2006.01)
- *B60T 13/68* (2006.01)
- *B60T 17/02* (2006.01)
- *B60T 8/88* (2006.01)
- *B60T 11/16* (2006.01)
- *B60T 11/28* (2006.01)
- *B60T 8/78* (2006.01)

(56) References Cited

U.S. PATENT DOCUMENTS

| | | | |
|---|---|---|---|
| 2007/0120418 A1* | 5/2007 | Kajita | B60T 7/12 303/114.1 |
| 2010/0283315 A1 | 11/2010 | Isono | |
| 2012/0013174 A1 | 1/2012 | Ishida | |

FOREIGN PATENT DOCUMENTS

| | | |
|---|---|---|
| JP | 2012-20707 A | 2/2012 |
| JP | 2012-66647 A | 4/2012 |

* cited by examiner

FLUID-PRESSURE BRAKE DEVICE FOR VEHICLE

TECHNICAL FIELD

The present invention relates to a fluid-pressure brake device for a vehicle, for example, a fluid-pressure brake device for a vehicle such as an electric vehicle and a hybrid vehicle that can be used along with a regenerative braking device.

BACKGROUND ART

The fluid-pressure brake device for a vehicle of this type is described, for example, in JP 2012-20707 A. A fluid-pressure brake device for a vehicle described in FIG. 1 of JP 2012-20707 A comprise a master cylinder, a fluid-pressure control circuit, and a fluid-pressure control actuator (ABS modulator).

The master cylinder comprise, a cylinder body having a cylinder bore, an input piston assembled to the cylinder bore of the cylinder body so as to be movable in a cylinder axial direction, so that the input piston forms a reaction force fluid chamber capable of supplying and discharging a working fluid to and from an inside of the cylinder body, the input piston being integrally drivable with a brake operation member, and a master piston which is arranged coaxially with the input piston, and is assembled to the cylinder bore so as to be movable in the cylinder axial direction to form a drive fluid chamber capable of supplying and discharging the working fluid to and from the inside of the cylinder body and a pressure chamber capable of supplying and discharging the working fluid to and from the inside of the cylinder body, the master piston being driven by the input piston or the working fluid supplied to the drive fluid chamber, the master cylinder being configured so that a fluid pressure in the drive fluid chamber is cancelled out for the input piston.

The fluid-pressure control circuit comprise an electric fluid-pressure source and an electromagnetic valve, actions thereof being controlled by an electric control unit depending on an action amount of the brake operation member.

The electric fluid-pressure source can supply the working fluid to the reaction force fluid chamber and the drive fluid chamber.

The electromagnetic valve can independently control a fluid pressure in the reaction force fluid chamber and the fluid pressure in the drive fluid chamber.

The fluid-pressure control actuator is interposed on a master system fluid-pressure circuit which connects the pressure chamber of the master cylinder and a pressure chamber of a wheel cylinder with each other. An action of the fluid-pressure control actuator is controlled depending on a slip state of a wheel, and can control the fluid pressure supplied to the pressure chamber of the wheel cylinder.

The fluid-pressure brake device for a vehicle described in FIG. 1 of JP 2012-20707 A is configured so that, during a normal brake action, the input piston is driven against the fluid pressure in the reaction force fluid chamber, and the master piston is driven by the working fluid supplied to the drive fluid chamber. The working fluid required in the master system fluid-pressure circuit during the braking is acquired by a pressure reception effective diameter (hereinafter simply referred to as "pressure reception diameter") and a stroke (a compression amount of the pressure chamber in the master cylinder) of the master piston.

SUMMARY OF INVENTION

Thus, depending on the fluid amount of the working fluid required in the master system fluid-pressure circuit during the braking, the pressure reception diameter and the stroke of the master piston are set, and physical dimensions of the master cylinder (such as sizes of the cylinder body, the input piston, and the master piston) are determined based thereon. Therefore, reductions of the physical dimensions of the master cylinder are limited (such as reductions in the size and the stroke of the master piston).

The present invention has been made to solve the above-mentioned problem.

According to the present invention, a fluid-pressure brake device for a vehicle comprise a master cylinder, a fluid-pressure control circuit, a master system fluid-pressure circuit, and a normally closed electromagnetic open/close valve.

The master cylinder comprises, a cylinder body having a cylinder bore, an input piston assembled to the cylinder bore of the cylinder body so as to be movable in a cylinder axial direction, so that the input piston forms a reaction force fluid chamber capable of supplying and discharging a working fluid to and from an inside of the cylinder body, the input piston being integrally drivable with a brake operation member, and a master piston which is arranged coaxially with the input piston, and is assembled to the cylinder bore so as to be movable in the cylinder axial direction to form a drive fluid chamber capable of supplying and discharging the working fluid to and from the inside of the cylinder body and a pressure chamber capable of supplying and discharging the working fluid to and from the inside of the cylinder body, the master piston being driven by the input piston or the working fluid supplied to the drive fluid chamber, the master cylinder being configured so that a fluid pressure in the drive fluid chamber does not act on said input piston in said cylinder axial direction.

The fluid-pressure control circuit comprises an electric fluid-pressure source and an electromagnetic valve, actions thereof being controlled by an electric control unit depending on an action amount of the brake operation member.

The electric fluid-pressure source being capable of supplying the working fluid to the reaction force fluid chamber and the drive fluid chamber, the electromagnetic valve being capable of independently controlling a fluid pressure in the reaction force fluid chamber and the fluid pressure in the drive fluid chamber.

The master system fluid-pressure circuit is configured to connect the pressure chamber of the master cylinder and a pressure chamber of a wheel cylinder with each other.

The normally closed electromagnetic open/close valve is interposed on a path connecting the master system fluid-pressure circuit and the drive fluid chamber with each other, and is configured to be opened when the action amount of the brake operation member is equal to or more than a set value.

The fluid-pressure brake device for a vehicle is configured so that when the electromagnetic open/close valve is opened, a fluid pressure supplied to the drive fluid chamber is added to a fluid pressure acquired in the pressure chamber of the master cylinder to thereby increase the fluid pressure.

In the fluid-pressure brake device for a vehicle according to the present invention, when the action amount of the brake operation member is equal to or more than the set value, without stroking the master piston, the working fluid (pressurized fluid) can be supplied from the fluid-pressure control circuit to the master system fluid-pressure circuit via the electromagnetic open/close valve interposed on the path connecting the master system fluid-pressure circuit and the drive fluid chamber with each other. Therefore, a necessary amount of the working fluid required in the master system fluid-pressure circuit (consumed fluid amount in the wheel cylinders) during the braking can be sufficiently secured by the working fluid supplied from the master cylinder to the master system fluid-pressure circuit and the working fluid supplied from the fluid-pressure control circuit to the master system fluid-pressure circuit via the electromagnetic open/close valve (valve interposed on the path). Thus, the size (diameter) and the stroke (stroke amount) of the master piston can be reduced in the fluid-pressure brake device.

As a result, according to the present invention, the physical dimensions of the master cylinder can be reduced (for example, effects due to the reductions in the size and the stroke of the master piston can be provided). Moreover, according to the present invention, a braking force can be increased by the reduction in the size (reduction in the diameter) of the master piston when the fluid-pressure circuit fails (when the master piston is driven by the input piston), as compared to a case in which the size of the master piston is not reduced. Note that, according to the present invention, the fluid-pressure brake device is configured so that the fluid pressure supplied to the drive fluid chamber is added to the fluid pressure acquired in the pressure chamber of the master cylinder in order to increase the pressure. Thus, the number of types of master cylinders can be reduced (that is, master cylinders can be used in common) even for various vehicles different in the consumed fluid amount in the wheel cylinders, by changing the amount of the working fluid supplied from the fluid-pressure control circuit to the master system fluid-pressure circuit depending on the consumed fluid amount in the wheel cylinders.

When carrying out the present invention as described above, the fluid-pressure brake device for a vehicle may further include a brake fluid-pressure control actuator (ABS modulator), an action thereof being controlled depending on a slip state of a wheel, the brake fluid-pressure control actuator being interposed on the master system fluid-pressure circuit and being configured to control the fluid pressure supplied to the pressure chamber of the wheel cylinder, and the fluid-pressure brake device may be configured so that, when the brake fluid-pressure control actuator is in action (ABS is in action), the electromagnetic open/close valve is closed even when the action amount of the brake operation member is equal to or more than the set value.

Moreover, in the fluid-pressure brake device for a vehicle according to the present invention, for example, when the vehicle is started (in a non-braking stop state before a travel), action checks (determination of normality/abnormality) for the fluid-pressure control circuit and the normally closed electromagnetic open/close valve can be carried out by executing the following first action check program (program including a normally closed electromagnetic open/close valve check mode and a circuit check mode). Moreover, an action check (determination of normality/abnormality in sealing) of the normally closed electromagnetic open/close valve can be carried out by executing the following second action check program. Note that, execution timings of the first action check program and the second action check program are not limited to the start of the vehicle (in the non-braking stop state before the travel), and can be any timing as long as the vehicle is stopped without braking.

When the normally closed electromagnetic open/close valve check mode (mode for checking the action of the normally closed electromagnetic open/close valve) of the first action check program is executed, the electric fluid-pressure source of the fluid-pressure control circuit and specific electromagnetic valves are brought into an action state (on a state capable of supplying the working fluid to the drive fluid chamber), the normally closed electromagnetic open/close valve is also brought into the action state (open state), and whether or not the fluid pressure in the drive fluid chamber is equal to or less than the set value is determined. On this occasion, when the fluid pressure in the drive fluid chamber is equal to or less than the set value, the normally closed electromagnetic open/close valve is determined to be normal. When the fluid pressure in the drive fluid chamber is not equal to or less than the set value, the normally closed electromagnetic open/close valve is determined to be abnormal.

Moreover, when the circuit check mode (mode for checking an entire circuit of the device) of the first action check program is executed, the electric fluid-pressure source of the fluid-pressure control circuit and specific electromagnetic valves are brought into the action state (state in which the working fluid supplied to the drive fluid chamber has a prescribed pressure), the normally closed electromagnetic open/close valve is brought into a non-action state (closed state), and whether or not the fluid pressure in the drive fluid chamber is equal to or more than the prescribed value is determined. On this occasion, when the fluid pressure in the drive fluid chamber is equal to or more than the prescribed value, the circuit is determined to be normal. When the fluid pressure in the drive fluid chamber is not equal to or more than the prescribed value, the circuit is determined to be abnormal.

On the other hand, when the second action check program is executed, the electric fluid-pressure source of the fluid-pressure control circuit and specific electromagnetic valves are brought into the action state (state in which the working fluid supplied to the drive fluid chamber has a predetermined pressure), and after the fluid pressure in the drive fluid chamber is set to a predetermined value, the electric fluid-pressure source of the fluid-pressure control circuit and the specific electromagnetic valves are brought into the non-action state. The state is maintained for a set period of time, and then, whether or not the fluid pressure in the drive fluid chamber is equal to or more than a prescribed value is determined. On this occasion, when the fluid pressure in the drive fluid chamber is equal to or more than the prescribed value, normality is determined (sealing of the respective valves are determined to be normal). When the fluid pressure in the drive fluid chamber is not equal to or more than the prescribed value, abnormality is determined (sealing of any of the valves is determined to be abnormal).

DESCRIPTION OF EMBODIMENTS

Figure 1:
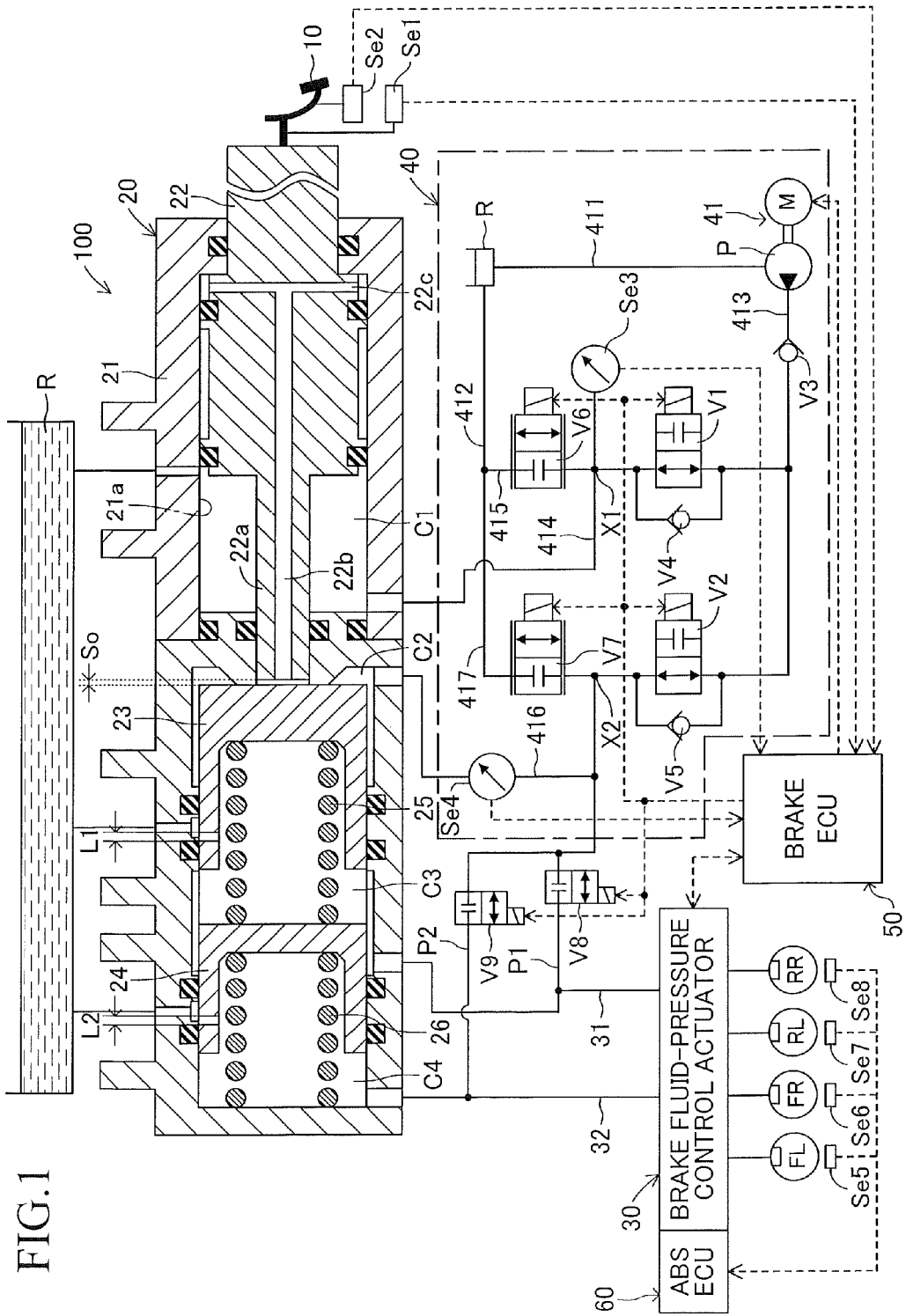
FIG. 1 is an overall configuration diagram for schematically illustrating a fluid-pressure brake device for a vehicle according to one embodiment of the present invention.

An embodiment of the present invention will be described hereinafter with reference to the drawings. FIG. 1 is a diagram for schematically illustrating a fluid-pressure brake device for a vehicle (hereinafter simply referred to as "brake device") according to the embodiment of the present invention. A brake device 100 comprises a brake pedal 10 as a brake operation member, a master cylinder 20 operable based on a depressing operation of the brake pedal 10, wheel cylinders FL, FR, RL, and RR, a brake fluid-pressure control actuator (ABS modulator) 30, a fluid-pressure control circuit 40, and a brake ECU (electric control unit) 50.

The brake pedal 10 is configured to be capable of integrally driving (pressing) an input piston 22 assembled to a cylinder body 21 of the master cylinder 20 when being depressed by a driver. An operation amount (action amount) of the brake pedal 10 is detected by a stroke sensor Se1 and a stepping force sensor Se2. Detection signals of the stroke sensor Se1 and the stepping force sensor Se2 are transmitted to the brake ECU 50, and a stroke sensor value S and a stepping force sensor value F can be recognized by the brake ECU 50. Note that, the brake operation member is not limited to the brake pedal 10, and can be realized, for example, by a brake lever or the like.

The master cylinder 20 includes the cylinder body 21, an input piston 22, a pair of front and rear master pistons 23 and 24, and a pair of front and rear springs 25 and 26. The cylinder body 21 has a cylinder bore 21a connected to a reservoir R, a brake fluid-pressure control actuator 30 and a fluid-pressure control circuit 40. The input piston 22, the master pistons 23 and 24 and the springs 25 and 26 are assembled to the cylinder body 21.

The input piston 22 is assembled to the cylinder bore 21a of the cylinder body 21 so as to be movable in a cylinder axial direction, so that the input piston 22 forms a reaction force fluid chamber C1 capable of supplying and discharging working fluid (brake fluid) to and from the cylinder body 21a. A rear end of the input piston 22 protrudes to the outside of the cylinder body 22 so that the input piston 22 can be driven by the brake pedal 10. Moreover, the input piston 22 includes a small diameter part 22a for engaging with and disengaging from the rear master piston 23. In a state of FIG. 1 (return position state), the small diameter part 22a is separated from the rear master piston 23 by a predetermined amount So in the axial direction.

The rear master piston 23 is arranged coaxially with the input piston 22, and is assembled to the cylinder bore 21a so as to be movable in the cylinder axial direction, so that the rear master piston 23 forms a drive fluid chamber C2 capable of supplying and discharging the working fluid to and from the inside of the cylinder body 21 between the input piston 22 and the rear master piston 23, and forms a pressure chamber C3 capable of supplying and discharging the working fluid to and from the inside of the cylinder body 21 between the front master piston 24 and the rear master piston 23. Moreover, the rear master piston 23 is biased by the spring 25 toward the position of FIG. 1 (return position), and is configured to be driven against an biasing force of the spring 25 by the small diameter part 22a of the input piston 22 or the working fluid supplied to the drive fluid chamber C2. Moreover, in this embodiment, an axial direction hole 22b and a radial direction hole 22c are formed in the input piston 22 so that the fluid pressure in the drive fluid chamber C2 is canceled out for the input piston 22 (the fluid pressure does not act on the input piston 22 in the axial direction of the input piston 22). Note that, as illustrated in FIG. 1, an idle stroke of the rear master piston 23 is set to a set value L1.

The front master piston 24 is arranged coaxially with the input piston 22 and the rear master piston 23, and is assembled to the cylinder bore 21a so as to be movable in the cylinder axial direction, so that the front master piston 24 forms a pressure chamber C4 capable of supplying and discharging the working fluid to and from the cylinder body 21 between a bottom wall (front wall) of the cylinder body 21 and the front master piston 24. Moreover, the front master piston 24 is biased by the spring 26 toward the position of FIG. 1 (return position), and is configured to be driven against an biasing force of the spring 26 by the spring 25 or the working fluid in the pressure chamber C3. Note that, as illustrated in FIG. 1, an idle stroke of the front master piston 24 is set to a set value L2.

The reaction force fluid chamber C1 and the drive fluid chamber C2 are connected to the fluid-pressure control circuit 40. Meanwhile, the respective pressure chambers C3 and C4 are connected to the respective wheel cylinders FL, FR, RL, and RR via the brake fluid-pressure control actuator 30. Note that, the reaction force fluid chamber C1 and the respective pressure chambers C3 and C4 are configured to communicate with the reservoir R when the respective pistons 22, 23, and 24 are at the return positions in FIG. 1. However, the reaction force fluid chamber C1 and the respective pressure chambers C3 and C4 are configured to be disconnected from the reservoir R when the respective pistons 22, 23, and 24 move forward from the return positions thereof by a predetermined amount or more.

Note that, configurations of the master cylinder 20 other than those described above are the same as configurations of the master cylinder of the fluid-pressure brake device for a vehicle described in FIG. 1 of JP 2012-20707 A, and a description thereof is therefore omitted. Moreover, respective configurations of the wheel cylinders FL, FR, RL, and RR and the brake fluid-pressure control actuator 30 are the same as respective configurations of the wheel cylinders and the brake fluid-pressure control actuator of the fluid-pressure brake device for a vehicle described in FIG. 1 of JP 2012-20707 A.

As is well known, the brake fluid-pressure control actuator 30 is a recirculation actuator including a pump, a motor, and respective selector valves V11 to V18 (refer to FIG. 2), and is interposed on master system fluid-pressure circuits 31 and 32 configured to connect the pressure chambers C3 and C4 of the master cylinder 20 and the pressure chambers of the wheel cylinders FL, FR, RL, and RR with each other. Moreover, the brake fluid-pressure control actuator 30 is configured such that actions of the pump and the motor and the actions of the respective selector valves V11 to V18 are controlled by an electric control unit (ABS ECU) 60 independent of the brake ECU 50 depending on slip states of the respective wheels (outputs of respective wheel speed sensors Se5, Se6, Se7, and Se8 illustrated in FIG. 1) in a well-known manner so that the fluid pressures of the working fluid supplied to the pressure chambers of the wheel cylinders FL, FR, RL, and RR are able to be controlled. Note that, it is possible to configure the brake fluid-pressure control actuator 30 and the brake ECU 50 so that the action of the brake fluid-pressure control actuator 30 can be controlled by the brake ECU 50.

The fluid-pressure control circuit 40 includes one electric fluid-pressure source 41 (pump P and motor M), the reservoir R, a first supply path 414, a first discharge path 415, a second supply path 416, and a second discharge path 417. The electric fluid-pressure source 41 can supply the working fluid to the reaction force fluid chamber C1 and the drive fluid chamber C2. The reservoir R is connected to an inlet path 411 of the electric fluid-pressure source 41 and a return flow passage 412, and stores the working fluid. The first supply path 414 connects an outlet path 413 of the electric fluid-pressure source 41 and the reaction force fluid chamber C1 with each other. The first discharge path 415 connects the first supply path 414 and the return flow passage 412 with each other. The second supply path 416 connects the outlet path 413 of the electric fluid-pressure source 41 and the drive fluid chamber C2 with each other. The second discharge path 417 connects the second supply path 416 and the return flow passage 412 with each other.

Moreover, the fluid-pressure control circuit 40 includes a first open/close valve V1, a second open/close valve V2, a main check valve V3, a first check valve V4, a second check valve V5, a first control valve V6, a second control valve V7, and a pair of pressure sensors Se3 and Se4. The first open/close valve V1 is a normally open electromagnetic open/close valve, and is interposed on the first supply path 414 upstream of a connection part X1 between the first supply path 414 and the first discharge path 415. The second open/close valve V2 is a normally open electromagnetic open/close valve, and is interposed on the second supply path 416 upstream of a connection part X2 between the second supply path 416 and the second discharge path 417.

The main check valve V3 is interposed on the outlet path 413 of the electric fluid-pressure source 41, and is configured to restrict a flow of the working fluid toward the upstream side. The first check valve V4 is arranged in parallel with the first open/close valve V1 on the first supply path 414, and is configured to restrict a flow of the working fluid toward the downstream side. The second check valve V5 is arranged in parallel with the second open/close valve V2 on the second supply path 416, and is configured to restrict a flow of the working fluid toward the downstream side.

The first control valve V6 is interposed on the first discharge path 415, and is configured to control the fluid pressure supplied from the electric fluid-pressure source 41 to the reaction force fluid chamber C1 depending on the action amount of the brake pedal 10. The second control valve V7 is interposed on the second discharge path 417, and is configured to control the fluid pressure supplied from the electric fluid-pressure source 41 to the drive fluid chamber C2 depending on the action amount of the brake pedal 10. The first control valve V6 and the second control valve V7 are configured to be controlled independently of each other, and the fluid pressure supplied to the reaction force fluid chamber C1 and the fluid pressure supplied to the drive fluid chamber C2 can be controlled independently of each other.

The pressure sensor Se3 is a sensor that detects a pressure in the first supply path 414 (fluid pressure supplied to the reaction force fluid chamber C1), and a detection signal thereof is transmitted to the brake ECU 50 so as to enable the brake ECU 50 to recognize a pressure Pr in the first supply path 414. On the other hand, the pressure sensor Se4 is a sensor that detects a pressure in the second supply path 416 (fluid pressure supplied to the drive fluid chamber C2), and a detection signal thereof is transmitted to the brake ECU 50 so as to enable the brake ECU 50 to recognize a pressure Ps in the second supply path 416.

Meanwhile, in this embodiment, the two systems of the master system fluid-pressure circuits 31 and 32 and the second supply path 416 (path connected to the drive fluid chamber C2) of the fluid-pressure control circuit 40 are respectively connected with each other via respective connection paths P1 and P2. The systems of the master system fluid-pressure circuits 31 and 32 connects the respective pressure chambers C3 and C4 of the master cylinder 20 and the respective pressure chambers of the wheel cylinders FL, FR, RL, and RR. Moreover, in this embodiment, normally closed electromagnetic open/close valves V8 and V9, actions thereof being controlled by the brake ECU 50 are respectively interposed on the respective connection paths P1 and P2.

The respective electromagnetic open/close valves V8 and V9 are configured so as to be opened when the action amount of the brake pedal 10 (brake operation member) is equal to or more than the set value (on this occasion, the communications between the reaction force fluid chamber C1 and the respective pressure chambers C3 and C4 of the master cylinder 20, and the reservoir R are shut off). The fluid-pressure brake device is configured so that when the respective electromagnetic open/close valves V8 and V9 are opened, the fluid pressure supplied to the drive fluid chamber C2 (fluid pressure slightly higher than the fluid pressure acquired in the respective pressure chambers C3 and C4) is added to the fluid pressure acquired in the respective pressure chambers C3 and C4 of the master cylinder 20 in order to increase the pressure.

Figure 3:
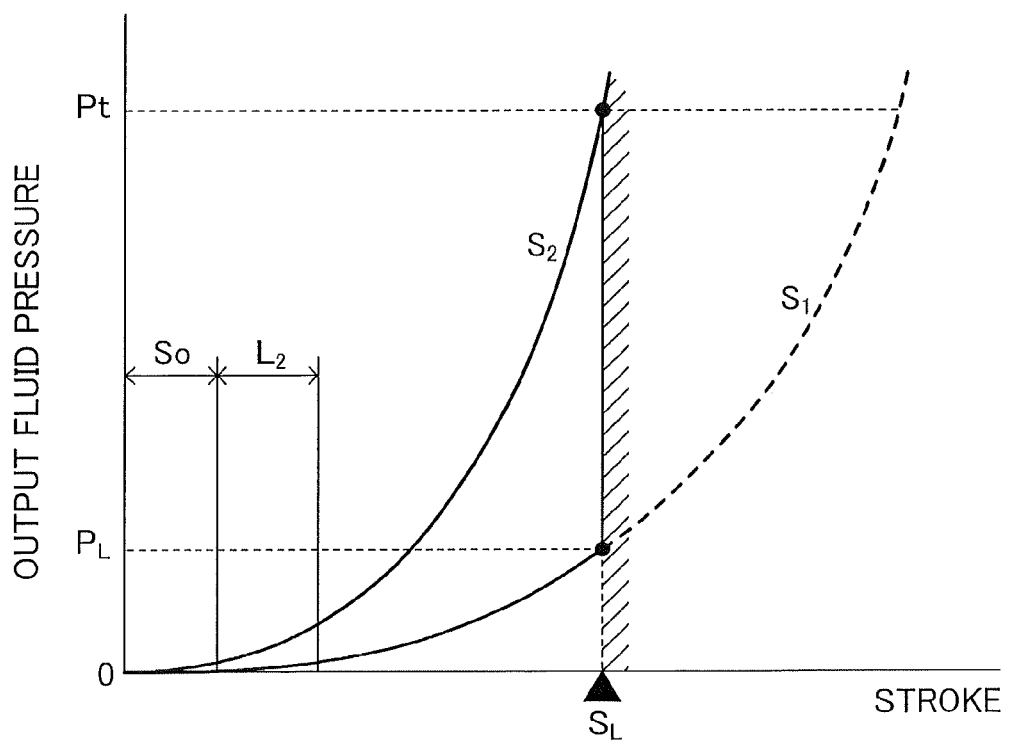
FIG. 3 is a graph for showing relationships between strokes and output fluid pressures (fluid pressures inside pressure chambers) of an input piston and a master piston in a master cylinder illustrated in FIG. 1 and FIG. 2.

Moreover, in this embodiment, as shown in FIG. 3, a stroke S1 of the master piston 23 when the respective electromagnetic open/close valves V8 and V9 are opened is set to a set value $S_L$, and an output fluid pressure (fluid pressure in the master system fluid-pressure circuits 31 and 32) on this occasion is set to a set value $P_L$. Moreover, the fluid-pressure brake device is configured so that, when the output fluid pressure reaches $P_r$, the input piston 22 abuts against the master piston 23. Therefore, the fluid-pressure brake device is configured so that, when the output fluid pressure is between $P_L$ and $P_r$, the master pistons 23 and 24 do not move forward in the axial direction. Note that, when the respective electromagnetic open/close valves V8 and V9 are switched from the closed state to the open state, in order to prevent the respective pressure chambers C3 and C4 from communicating with the reservoir R even if the respective master cylinders 23 and 24 move backward, a lower limit value of the set value $S_L$ is desirably "So+L2" or more when L2≥L1 is established.

In the embodiment, respective actions of the electric fluid-pressure source 41, the first open/close valve V1, the second open/close valve V2, the first control valve V6, the second control valve V7, and the like (electric devices in the fluid-pressure control circuit 40), and the first electromagnetic open/close valve V8 and the second electromagnetic open/close valve V9 are controlled by the brake ECU (electric control unit) 50 based on the detection signals of the respective sensors Se1 to Se4, a signal for determining action/non-action of the brake fluid-pressure control actuator 30 (signal acquired from the brake fluid-pressure control actuator 30 or the ABS ECU 60), and the like.

Moreover, in this embodiment, during the normal brake action (braking without the ABS action), the fluid pressure in the drive fluid chamber C2 (fluid pressure acquired after the pressure of the working fluid discharged from the electric fluid-pressure source 41 to the outlet path 413 and supplied to the second supply path 416 is controlled to be reduced by the second control valve V7) is set to be higher than the fluid pressure in the reaction force fluid chamber C1 (fluid pressure acquired after the pressure of the working fluid discharged from the electric fluid-pressure source 41 to the outlet path 413 and supplied to the first supply path 414 is controlled to be reduced by the first control valve V6).

Figure 4:
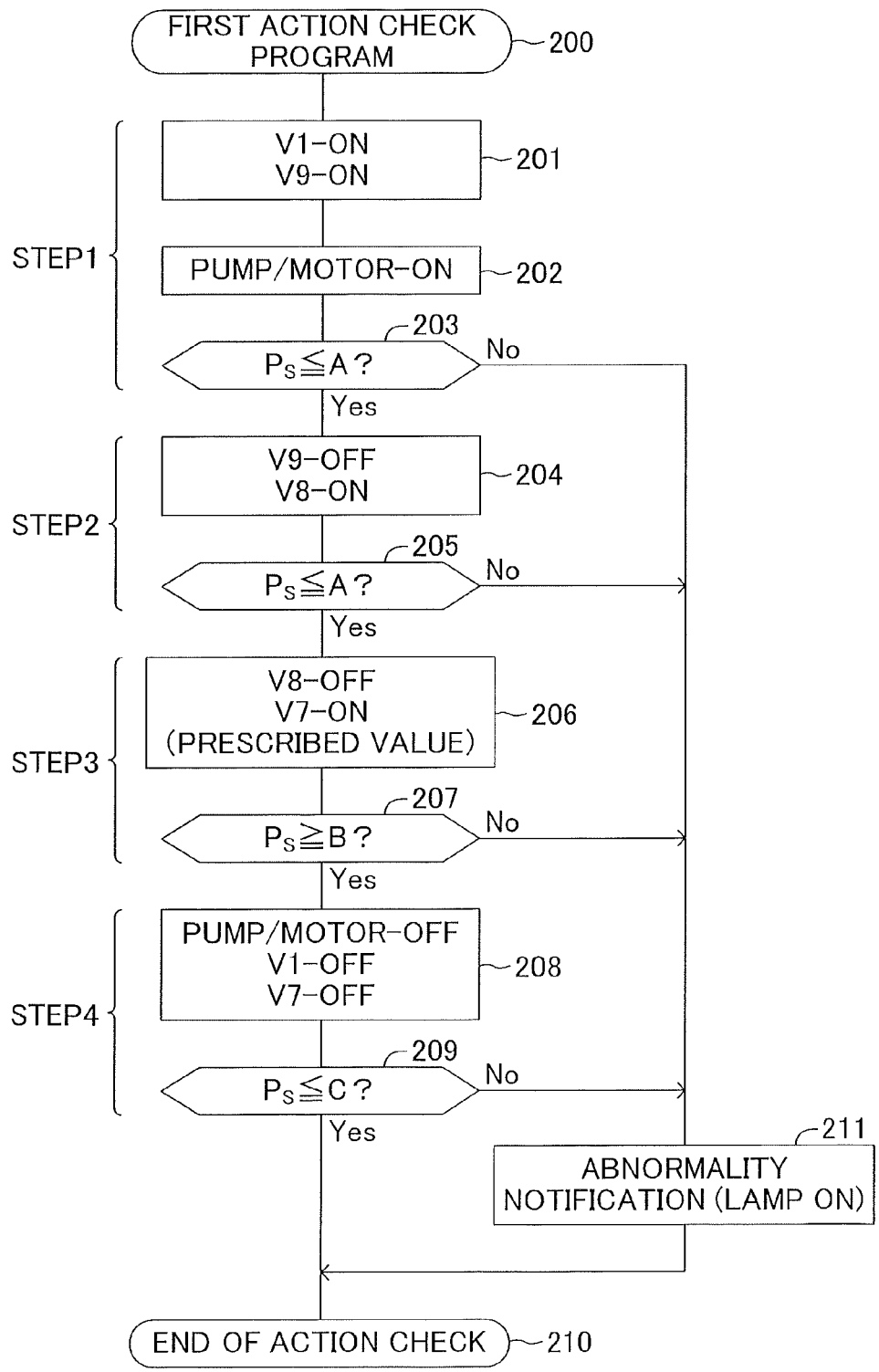
FIG. 4 is a flowchart of a first action check program executed by a brake ECU (electric control unit) illustrated in FIG. 1.
Figure 9:
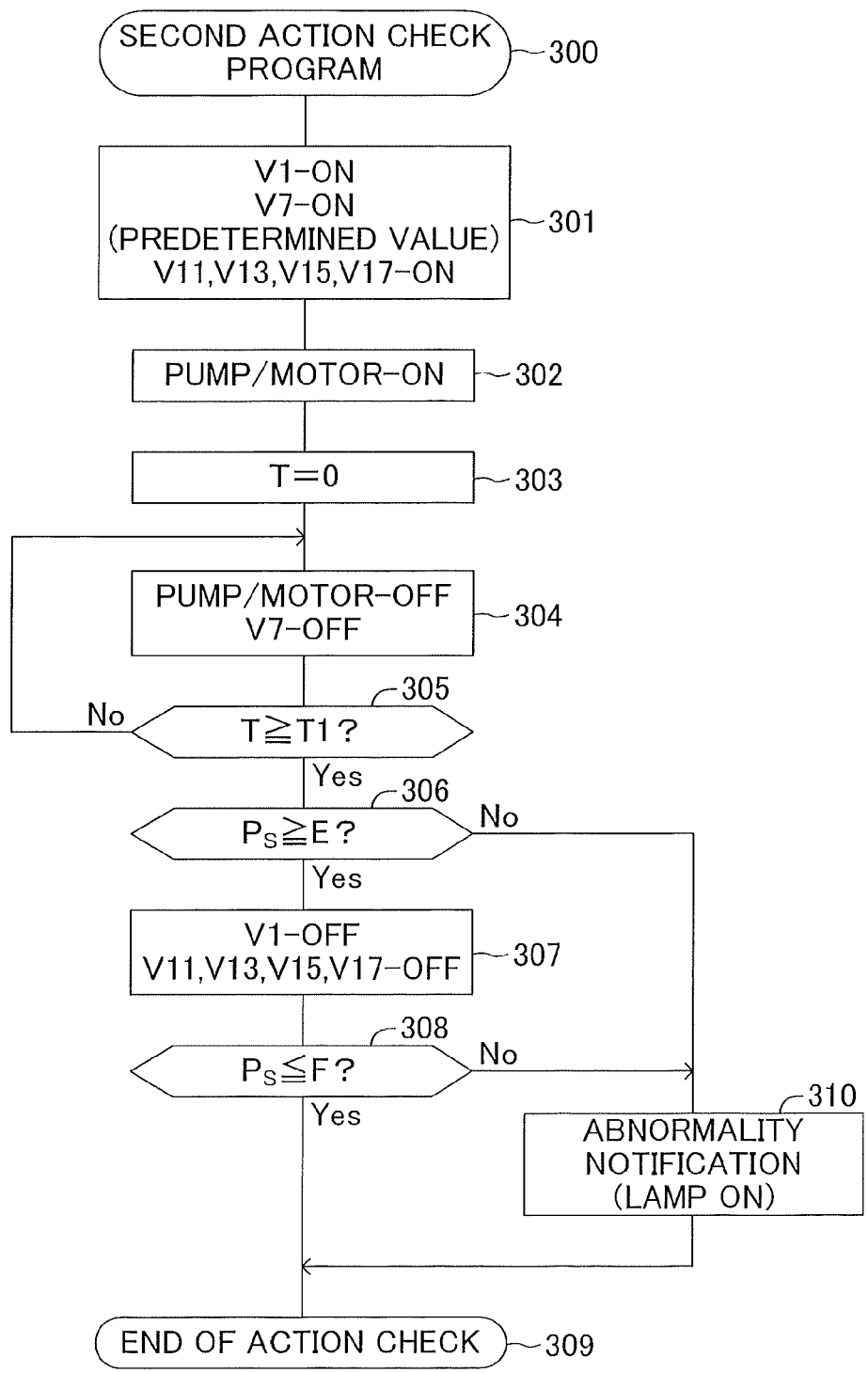
FIG. 9 is a flowchart of a second action check program executed by the brake ECU (electric control unit) illustrated in FIG. 1.

The brake ECU 50 includes a brake action control program (not shown), a first action check program 200 illustrated in FIG. 4, and a second action check program 300 illustrated in FIG. 9. The brake action control program (not shown) includes "ABS non-action state control program" for controlling the actions of the electric devices (such as the electric fluid-pressure source 41, the first open/close valve V1, the second open/close valve V2, the first control valve V6, and the second control valve V7) of the fluid-pressure control circuit 40 and the respective electromagnetic open/close valves V8 and V9 during the normal brake action (during the braking without the ABS action), and "ABS action state control program" for controlling the actions of the electric devices of the fluid-pressure control circuit 40 and the respective electromagnetic open/close valves V8 and V9 during the ABS action.

Figure 2:
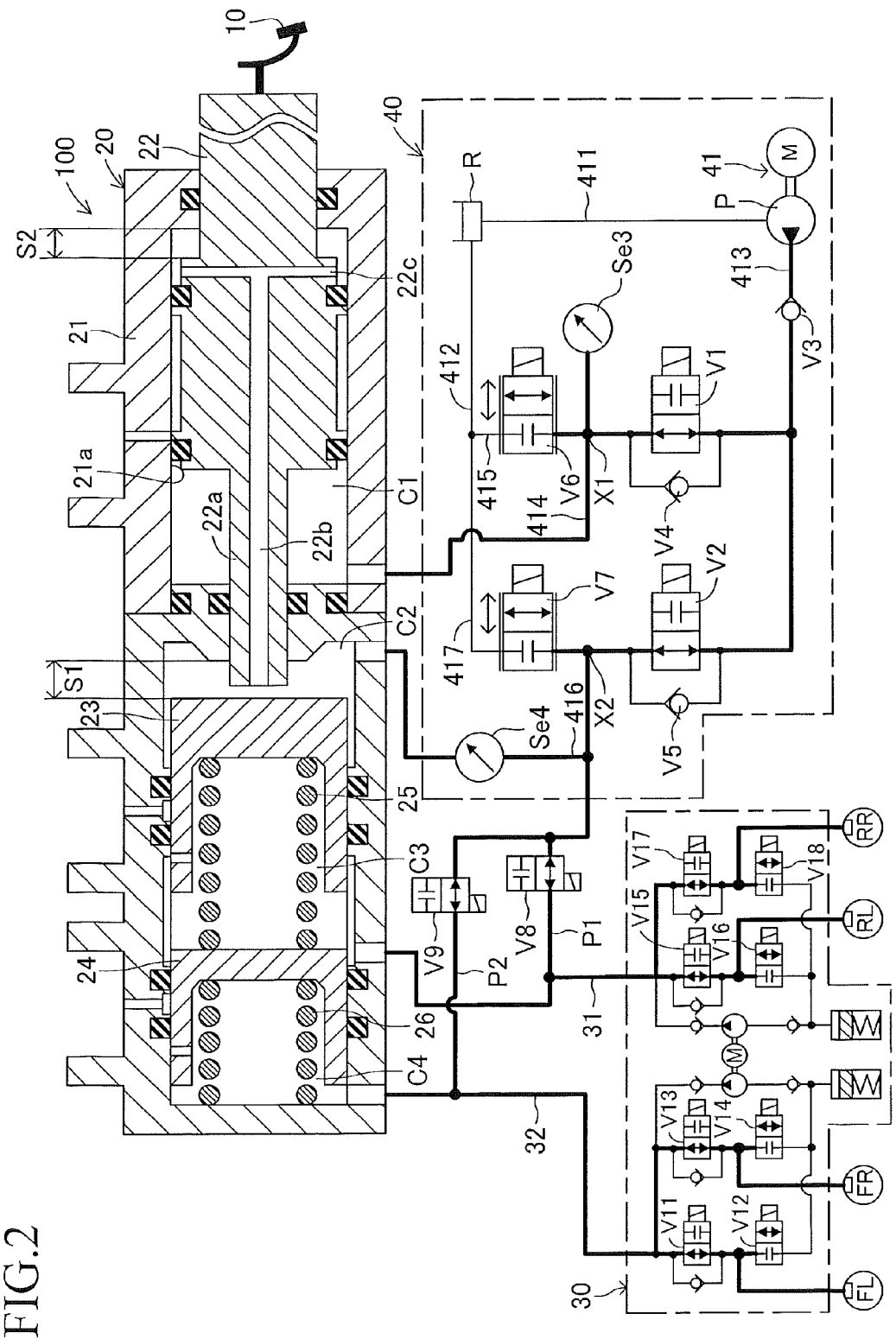
FIG. 2 is a partial configuration diagram for illustrating a normal brake action state (ABS non-action state) of a principal part of the fluid-pressure brake device for a vehicle illustrated in FIG. 1.

In the configuration of the embodiment as described above, during the normal brake action in which the entire fluid-pressure system and electric system of the fluid-pressure brake device are normal and the action amount (operation amount) of the brake pedal 10 is equal to or more than the set value (when the stroke S1 of the master piston 23 has the set value $S_L$), as illustrated in FIG. 2, the first control valve V6 and the second control valve V7 (electromagnetic valves) of the fluid-pressure control circuit 40 independently control the fluid pressures in the reaction force fluid chamber C1 and the drive fluid chamber C2 depending on the action amount (operation amount) of the brake pedal 10.

Moreover, on this occasion, both the electromagnetic open/close valves V8 and V9 are opened, and the working fluid can be supplied from the second supply path 416 of the fluid-pressure control circuit 40 to the respective master system fluid-pressure circuits 31 and 32 via the respective electromagnetic open/close valves V8 and V9 without stroking the respective master pistons 23 and 24. Therefore, a necessary amount of the working fluid required in the respective master system fluid-pressure circuits 31 and 32 during the braking (consumed fluid amount in the respective wheel cylinders FL, FR, RL, and RR) can be sufficiently secured by the working fluid supplied from the respective pressure chambers C3 and C4 of the master cylinder 20 to the master system fluid-pressure circuits and the working fluid (pressurized fluid) supplied from the fluid-pressure control circuit 40 to the respective master system fluid-pressure circuits 31 and 32 via the respective electromagnetic open/close valves V8 and V9.

Thus, in this case, the pressurized fluid is independently supplied from the first supply path 414 and the second supply path 416 of the fluid-pressure control circuit 40 to the reaction force fluid chamber C1 and the drive fluid chamber C2 of the master cylinder 20, and the working fluid is supplied from the respective pressure chambers C3 and C4 of the master cylinder 20 and the second supply path 416 of the fluid-pressure control circuit 40 to the respective master system fluid-pressure circuits 31 and 32, such that the working fluid is supplied from the respective master system fluid-pressure circuits 31 and 32 to the respective pressure chambers of the wheel cylinders FL, FR, RL, and RR. As a result, the fluid pressures (the fluid pressure in the reaction force fluid chamber C1, the fluid pressure in the drive fluid chamber C2, and the fluid pressures in the respective master system fluid-pressure circuits 31 and 32) corresponding to the action amount (operation amount) of the brake pedal 10 are acquired, and expected reaction force and braking force are acquired.

Moreover, in this embodiment, when the electric system of the fluid-pressure control circuit 40 fails (for example, when a power supply to the fluid-pressure control circuit 40 fails), in the fluid-pressure control circuit 40, the electric fluid-pressure source (pump and motor) 41 is brought into a stop state, the first open/close valve V1 and the second open/close valve V2 are brought into the open state, and the first control valve V6, the second control valve V7, and both the electromagnetic open/close valves V8 and V9 are brought into the closed state (refer to FIG. 1). Therefore, in a state in which the flow of the working fluid toward the upstream side is restricted by the main check valve V3 in the outlet path 413 of the electric fluid-pressure source 41, the reaction force fluid chamber C1 is connected to (is in communication with) the drive fluid chamber C2 via the first supply path 414 on which the first open/close valve V1 and the first check valve V4 are interposed and the second supply path 416 on which the second open/close valve V2 and the second check valve V5 are interposed.

Thus, in this case, the working fluid in the reaction force fluid chamber C1 is supplied to the drive fluid chamber C2 without delay via the first supply path 414 and the second supply path 416 depending on the action amount (operation amount) of the brake pedal 10, and the master pistons 23 and 24 act without ineffective strokes. Therefore, the master cylinder 20 acts appropriately and can generate an expected braking force. Note that, an expected reaction force is not acquired in this case.

Moreover, in this embodiment, the fluid-pressure brake device is configured so that both the electromagnetic open/close valves V8 and V9 are maintained in the closed state during a failure in which the fluid pressure in the reaction force fluid chamber C1 and the fluid pressure in the drive fluid chamber C2 do not increase (this failure can be detected by the respective sensors Se1 to Se4) regardless of the action of the brake pedal 10. In this case, the master piston 23 is directly driven by the input piston 22. Along with the driving, the working fluid is supplied from the respective pressure chambers C3 and C4 of the master cylinder 20 to the respective master system fluid-pressure circuits 31 and 32, and the working fluid is supplied from the respective master system fluid-pressure circuits 31 and 32 to the respective pressure chambers of the wheel cylinders FL, FR, RL, and RR. Thus, in this case, in a state in which both the electromagnetic open/close valves V8 and V9 are maintained in the closed state, the working fluid is supplied from the respective pressure chambers C3 and C4 of the master cylinder 20 to the respective pressure chambers of the wheel cylinders FL, FR, RL, and RR, and the braking forces are acquired.

Note that, in the embodiment, if the fluid-pressure brake device is configured so that a current is supplied to the second open/close valve V2 in a state in which regenerative braking is required during the normal brake action (refer to FIG. 2), the second open/close valve V2 closes the second supply path 416, thereby shutting off the fluid-pressure supply from the electric fluid-pressure source (pump and motor) 41 to the drive fluid chamber C2. Therefore, in this case, the braking force is acquired by a regenerative braking device (not shown), and a state in which the brake operation reaction force is acquired in the master cylinder 20 but the braking forces are not acquired can be realized. Accordingly, a brake action securing a high regeneration efficiency can be acquired.

Moreover, in the embodiment, if the fluid-pressure brake device is configured so that a current is supplied to the first open/close valve V1 in a state in which an automatic brake action (brake action not caused by the action (operation) of the brake pedal 10) is required, the first open/close valve V1 closes the first supply path 414, thereby shutting off the fluid-pressure supply from the electric fluid-pressure source (pump and motor) 41 to the reaction force fluid-pressure chamber C1. Note that, in the state in which the automatic brake action is required, in addition to the current supply state of the first open/close valve V1, the electric fluid-pressure source (pump and motor) 41 is brought into the drive state, and the second control valve V7 is brought into the control state. Therefore, the fluid pressure is supplied from the electric fluid-pressure source (pump and motor) 41 to the drive fluid chamber C2, this fluid pressure is controlled by the second control valve V7, and a desired brake action is acquired.

Moreover, in the embodiment, for example, the fluid-pressure brake device is configured so that, when the vehicle is started (in a non-braking stop state before a travel), the first action check program 200 illustrated in FIG. 4 and the second action check program 300 illustrated in FIG. 9 are respectively executed. The first action check program 200 illustrated in FIG. 4 can carry out the action checks (determination of normality/abnormality) for the fluid-pressure control circuit 40 and the normally closed electromagnetic open/close valves V8 and V9, and includes a normally closed electromagnetic open/close valve check mode ("STEP1" and "STEP2" of FIG. 4) and a circuit check mode ("STEP3" of FIG. 4). The second action check program 300 illustrated in FIG. 9 can carry out the action check (determination of normality/abnormality in sealing) for the normally closed electromagnetic open/close valves V8 and V9.

"STEP1" of the first action check program 200 illustrated in FIG. 4 checks the action of the second electromagnetic open/close valve V9, and, in Step 201, the first open/close valve V1 of the fluid-pressure control circuit 40 is brought into the action state (on state), and the electromagnetic open/close valve V9 is also brought into the action state (on state). Moreover, in Step 202, the electric fluid-pressure source 41 (pump P and motor M) is brought into the action state (on state). As a result, the fluid-pressure control circuit 40 and the electromagnetic open/close valve V9 are switched from the states illustrated in FIG. 1 to the states illustrated in FIG. 5, and the working fluid flowing from the electric fluid-pressure source 41 into the pressure chamber C4 via the second open/close valve V2 and the electromagnetic open/close valve V9 flows toward the reservoir R.

Figure 5:
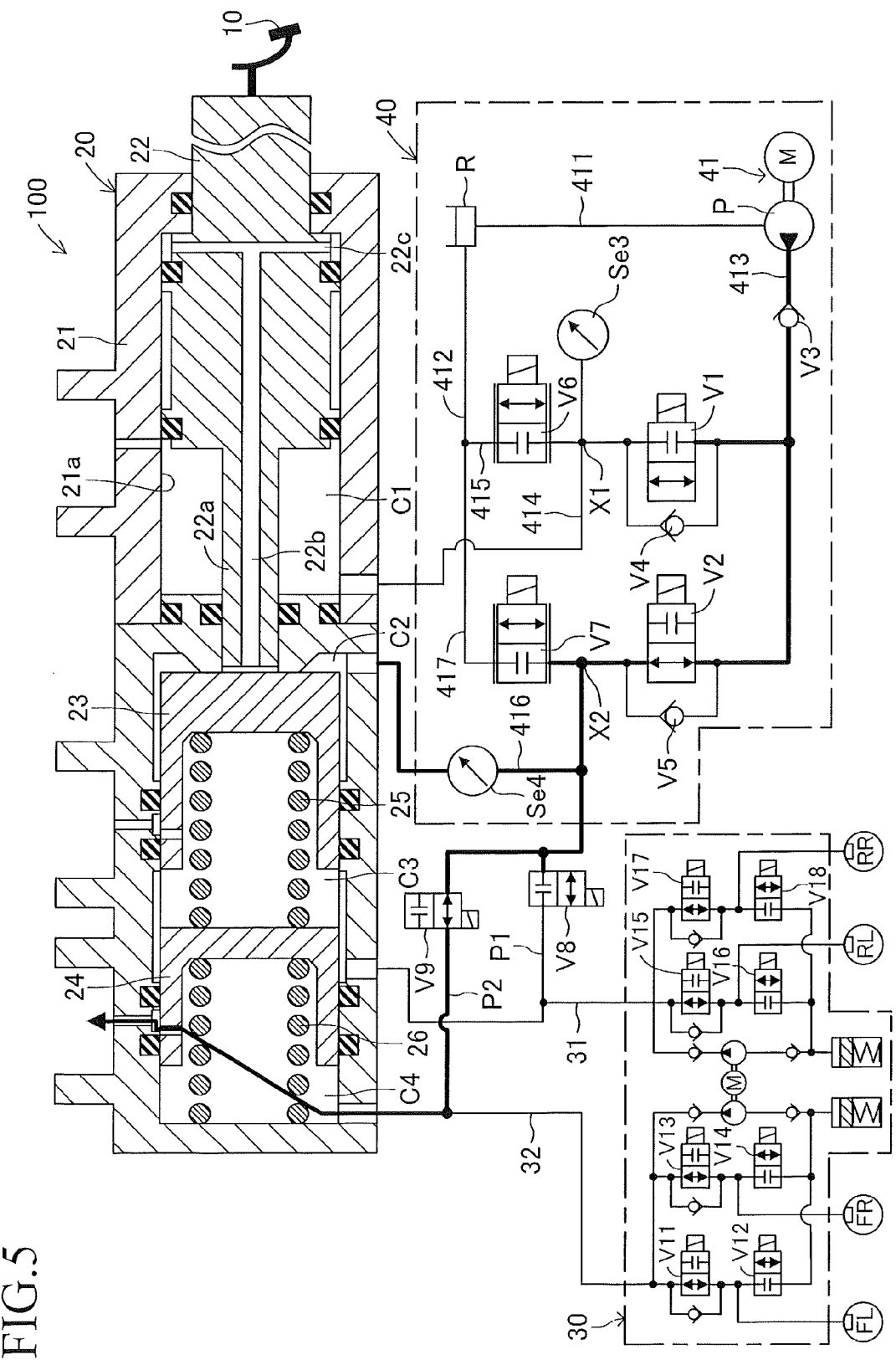
FIG. 5 is a partial configuration diagram corresponding to FIG. 2, for illustrating a state in STEP1 of FIG. 4 (state of checking an action of a second normally closed electromagnetic open/close valve).

Therefore, if the program is configured so that Step 203 is carried out at a timing when the state illustrated in FIG. 5 is brought about (that is, a step of delaying the execution of Step 203 by a required period of time is added between Step 202 and Step 203), a determination of "Yes" in Step 203 is a determination of the normality of the electromagnetic open/close valve V9, and a determination of "No" in Step 203 is a determination of the abnormality of the electromagnetic open/close valve V9. Note that, in Step 203, whether or not the working fluid flowing from the electric fluid-pressure source 41 into the pressure chamber C4 is flowing toward the reservoir R is determined based on whether or not the pressure Ps in the second supply path 416 detected by the pressure sensor Se4 is equal to or less than a predetermined value A. When the determination of "No" is made, Step 211 is carried out, and an abnormality notification (turning on a lamp) is carried out.

Moreover, "STEP2" of the first action check program 200 illustrated in FIG. 4 checks the action of the first electromagnetic open/close valve V8, and, in Step 204, in a state in which the first open/close valve V1 of the fluid-pressure control circuit 40 and the electric fluid-pressure source 41 (pump P and motor M) are maintained in the action state (on state), the electromagnetic open/close valve V9 is brought into the non-action state (off state), and the electromagnetic open/close valve V8 is brought into the action state (on state). As a result, the electromagnetic open/close valves V8 and V9 are switched from the states illustrated in FIG. 5 to the states illustrated in FIG. 6, and the working fluid flowing from the electric fluid-pressure source 41 into the pressure chamber C3 via the second open/close valve V2 and the electromagnetic open/close valve V8 flows toward the reservoir R.

Figure 6:
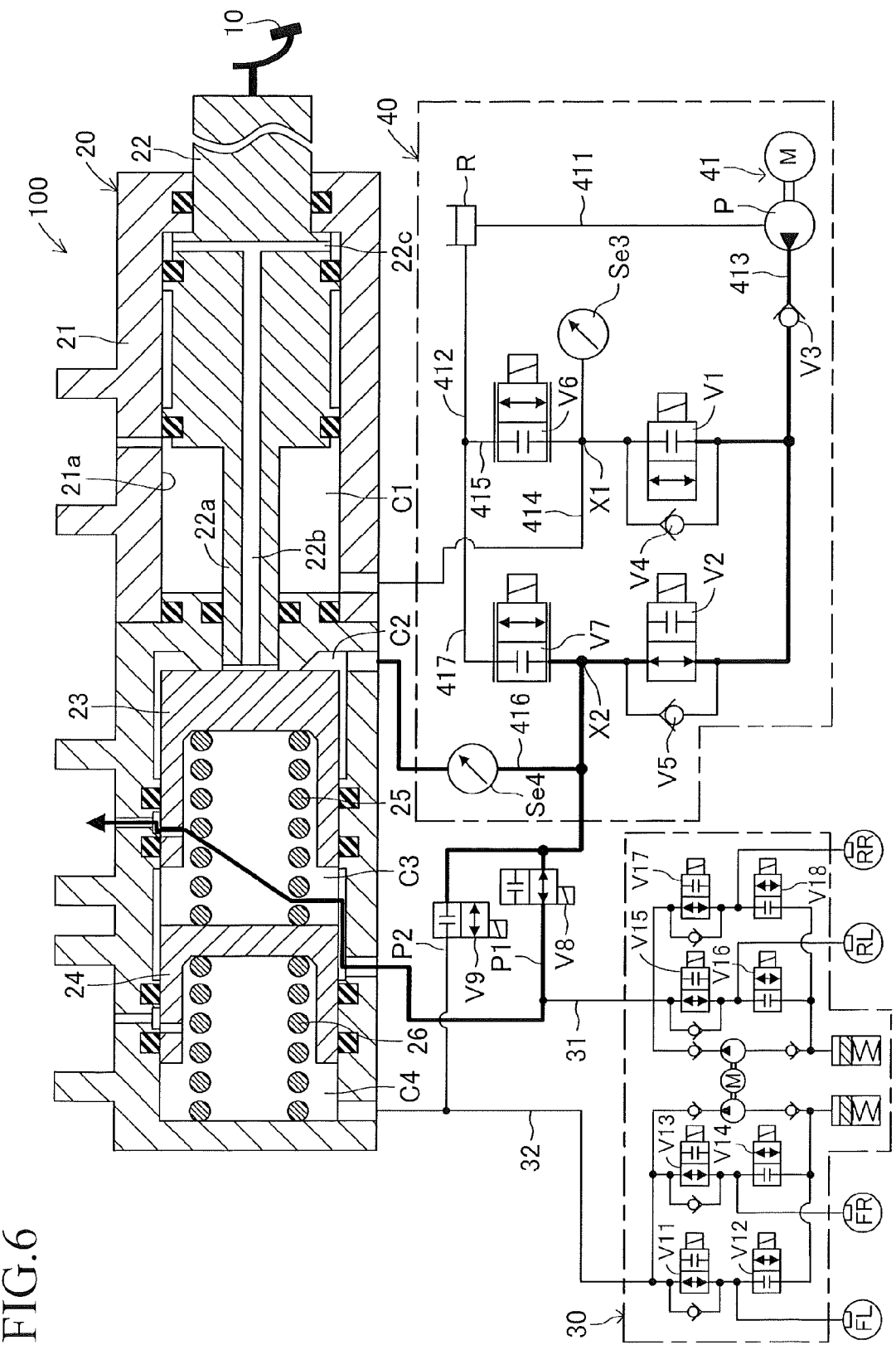
FIG. 6 is a partial configuration diagram corresponding to FIG. 2, for illustrating a state in STEP2 of FIG. 4 (state of checking an action of a first normally closed electromagnetic open/close valve).

Therefore, if the program is configured so that that Step 205 is carried out at a timing when the state illustrated in FIG. 6 is brought about (that is, a step of delaying the execution of Step 205 by a required period of time is added between Step 204 and Step 205), a determination of "Yes" in Step 205 is a determination of the normality of the electromagnetic open/close valve V8, and a determination of "No" in Step 205 is a determination of the abnormality of the electromagnetic open/close valve V8. Note that, in Step 205, whether or not the working fluid flowing from the electric fluid-pressure source 41 into the pressure chamber C3 is flowing toward the reservoir R is determined based on whether or not the pressure Ps in the second supply path 416 detected by the pressure sensor Se4 is equal to or less than the predetermined value A. When the determination of "No" is made, Step 211 is carried out, and an abnormality notification (turning on a lamp) is carried out.

Meanwhile, "STEP3" of the first action check program illustrated in FIG. 4 mainly checks the fluid-pressure circuit of the fluid-pressure control circuit 40. In Step 206, in a state in which the first open/close valve V1 of the fluid-pressure control circuit 40 and the electric fluid-pressure source 41 (pump P and motor M) are maintained in the action state (on state), the electromagnetic open/close valve V8 is brought into the non-action state (off state), and the second control valve V7 of the fluid-pressure control circuit 40 is brought into the action state (on state in which the fluid pressure supplied to the drive fluid chamber C2 has a prescribed value). As a result, the master cylinder 20 and the fluid-pressure control circuit 40 are switched from the states illustrated in FIG. 6 to the states illustrated in FIG. 7, and the respective master pistons 23 and 24 are actuated by the pressurized fluid supplied to the drive fluid chamber C2.

Figure 7:
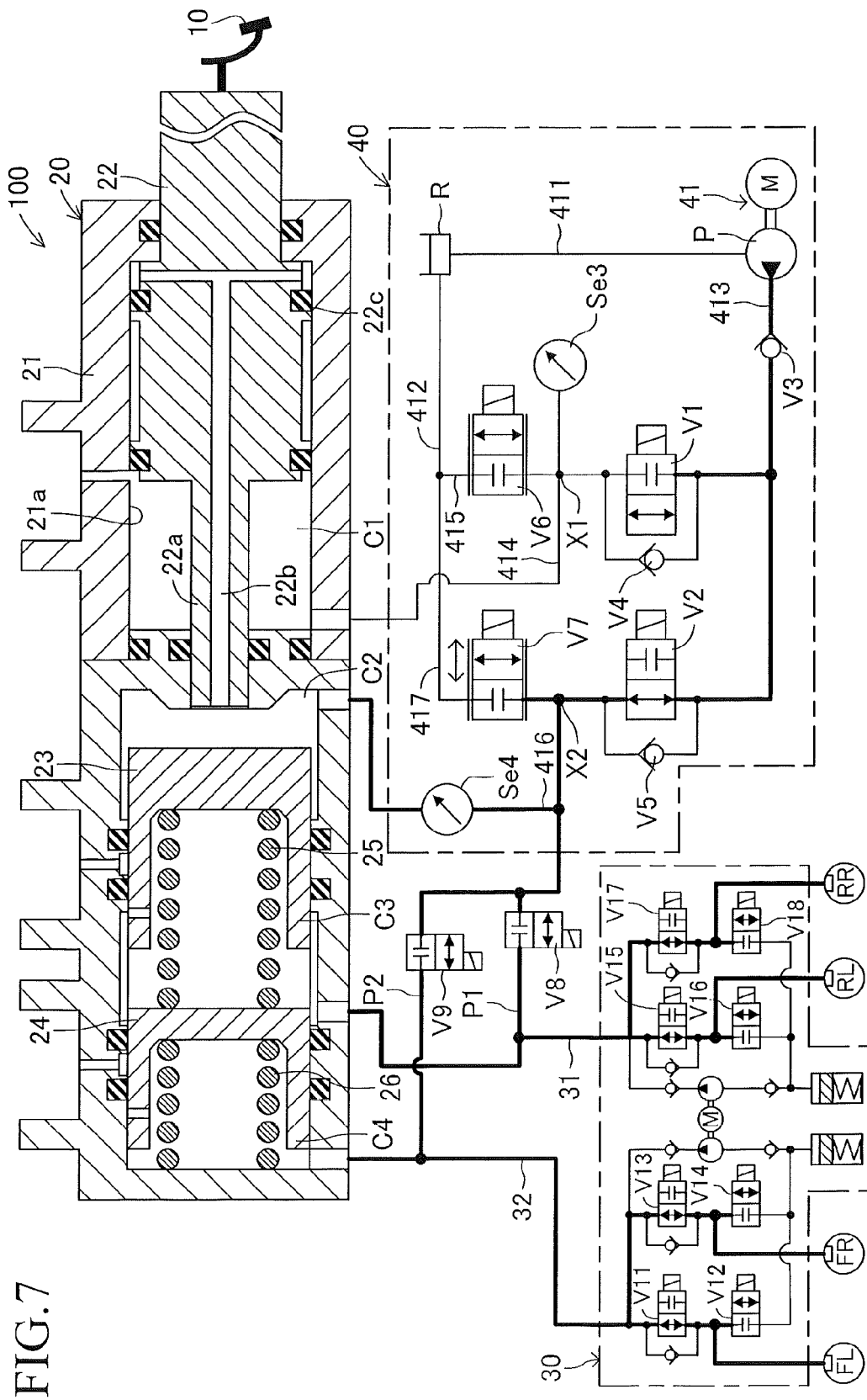
FIG. 7 is a partial configuration diagram corresponding to FIG. 2, for illustrating a state in STEP3 of FIG. 4 (state of checking an overall circuit of the fluid-pressure brake device).

Therefore, if the program is configured so that Step 207 is carried out at a timing when the state illustrated in FIG. 7 is brought about (that is, a step of delaying the execution of Step 207 by a required period of time is added between Step 206 and Step 207), a determination of "Yes" in Step 207 is a determination of the normality of the fluid-pressure circuit, and a determination of "No" in Step 207 is a determination of the abnormality of the fluid-pressure circuit. Note that, in Step 207, whether or not the pressure of the working fluid supplied from the electric fluid-pressure source 41 to the drive fluid chamber C2 is increased to a necessary and sufficient value is determined based on whether or not the pressure Ps in the second supply path 416 detected by the pressure sensor Se4 is equal to or more than a predetermined value B. When the determination of "No" is made, Step 211 is carried out, and an abnormality notification (turning on a lamp) is carried out.

Note that, "STEP4" of the first action check program 200 illustrated in FIG. 4 brings the master cylinder 20 and the fluid-pressure control circuit 40 back to the initial states (states illustrated in FIG. 1). In Step 208, the first open/close valve V1 of the fluid-pressure control circuit 40 and the electric fluid-pressure source 41 (pump P and motor M) are brought into the non-action state (off state), and the second control valve V7 of the fluid-pressure control circuit 40 is brought into the non-action state (off state). As a result, the master cylinder 20 and the fluid-pressure control circuit 40 return from the states illustrated in FIG. 7 to the states illustrated in FIG. 1 via the states illustrated in FIG. 8.

Figure 8:
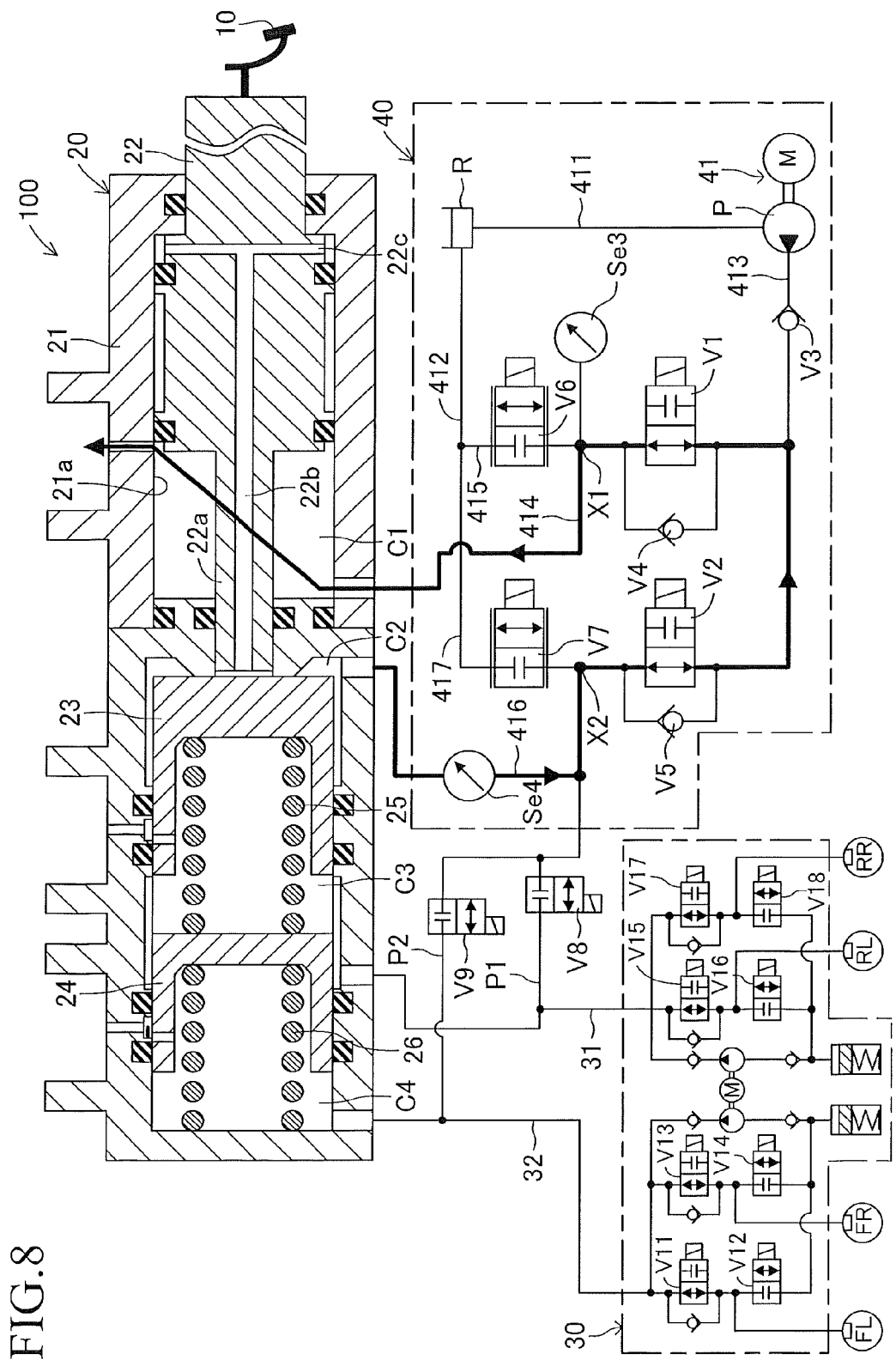
FIG. 8 is a partial configuration diagram corresponding to FIG. 2, for illustrating a state in STEP4 of FIG. 4 (state of returning to an initial state).

Therefore, if the program is configured so that Step 209 is carried out at a timing when the state illustrated in FIG. 8 is brought about (that is, a step of delaying the execution of Step 209 by a required period of time is added between Step 208 and Step 209), a determination of "Yes" in Step 209 is a determination of the normality of the return action, and a determination of "No" in Step 209 is a determination of the abnormality of the return action. Note that, in Step 209, whether or not the working fluid is flowing from the drive fluid chamber C2 toward the reservoir R via the reaction force fluid chamber C1 is determined based on whether or not the pressure Ps in the second supply path 416 detected by the pressure sensor Se4 is equal to or less than a predetermined value C. When the determination of "No" is made, Step 211 is carried out, and an abnormality notification (turning on a lamp) is carried out. After the execution of Step 209 or Step 211, Step 210 is carried out, and the action check by the first action check program 200 is finished.

Step 301 to Step 306 of the second action check program 300 illustrated in FIG. 9 check the sealing states of the normally closed electromagnetic open/close valves V8 and V9. In Step 301, the first open/close valve V1 of the fluid-pressure control circuit 40 is brought into the action state (on state), the second control valve V7 of the fluid-pressure control circuit 40 is brought into the action state (ON state in which the fluid pressure supplied to the drive fluid chamber C2 has a predetermined value), and the respective selector valves V11, V13, V15, and V17 of the brake fluid-pressure control actuator 30 are brought into the action state (on state). Moreover, in Step 302, the electric fluid-pressure source 41 (pump P and motor M) is brought into the action state (on state). As a result, the working fluid is supplied from the electric fluid-pressure source 41 to the drive fluid chamber C2, and the device 100 is switched from the state illustrated in FIG. 1 to the state illustrated in FIG. 10.

Figure 10:
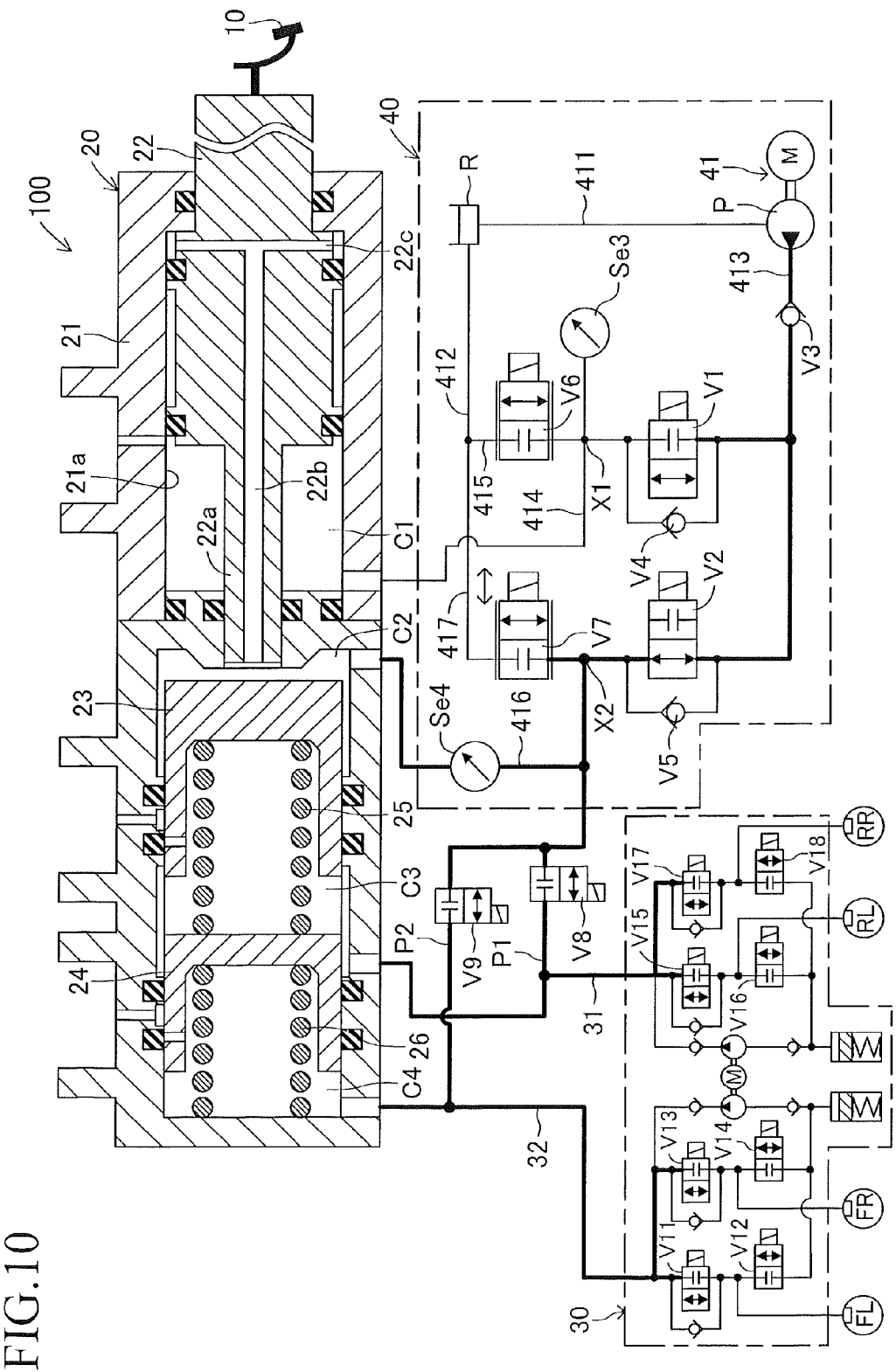
FIG. 10 is a partial configuration diagram corresponding to FIG. 2, for illustrating a state in which both the normally closed electromagnetic open/close valves are normally acting when the second action check program of FIG. 8 is executed.

Therefore, if the program is configured so that Step 303 to Step 306 are carried out at a timing when the state illustrated in FIG. 10 is brought about (that is, a step of delaying the execution of Step 306 by a required period of time is added between Step 302 and Step 306), a determination of "Yes" in Step 306 is a determination of the normality of the sealing states of the normally closed electromagnetic open/close valves V8 and V9, and a determination of "No" in Step 306 is a determination of the abnormality of the sealing states of the normally closed electromagnetic open/close valves V8 and V9.

Note that, in Step 303, a count value T of a timer is set to zero, and in Step 304, the electric fluid-pressure source 41 (pump P and motor M) is brought into the non-action state (off state), and the second control valve V7 of the fluid-pressure control circuit 40 is also brought into the non-action state (off state). Moreover, in Step 305, whether or not the count value T of the timer is a set value T1 is determined. When the determination of "No" is made, Step 304 and Step 305 are carried out. When the determination of "Yes" is made, Step 306 is carried out.

Figure 11:
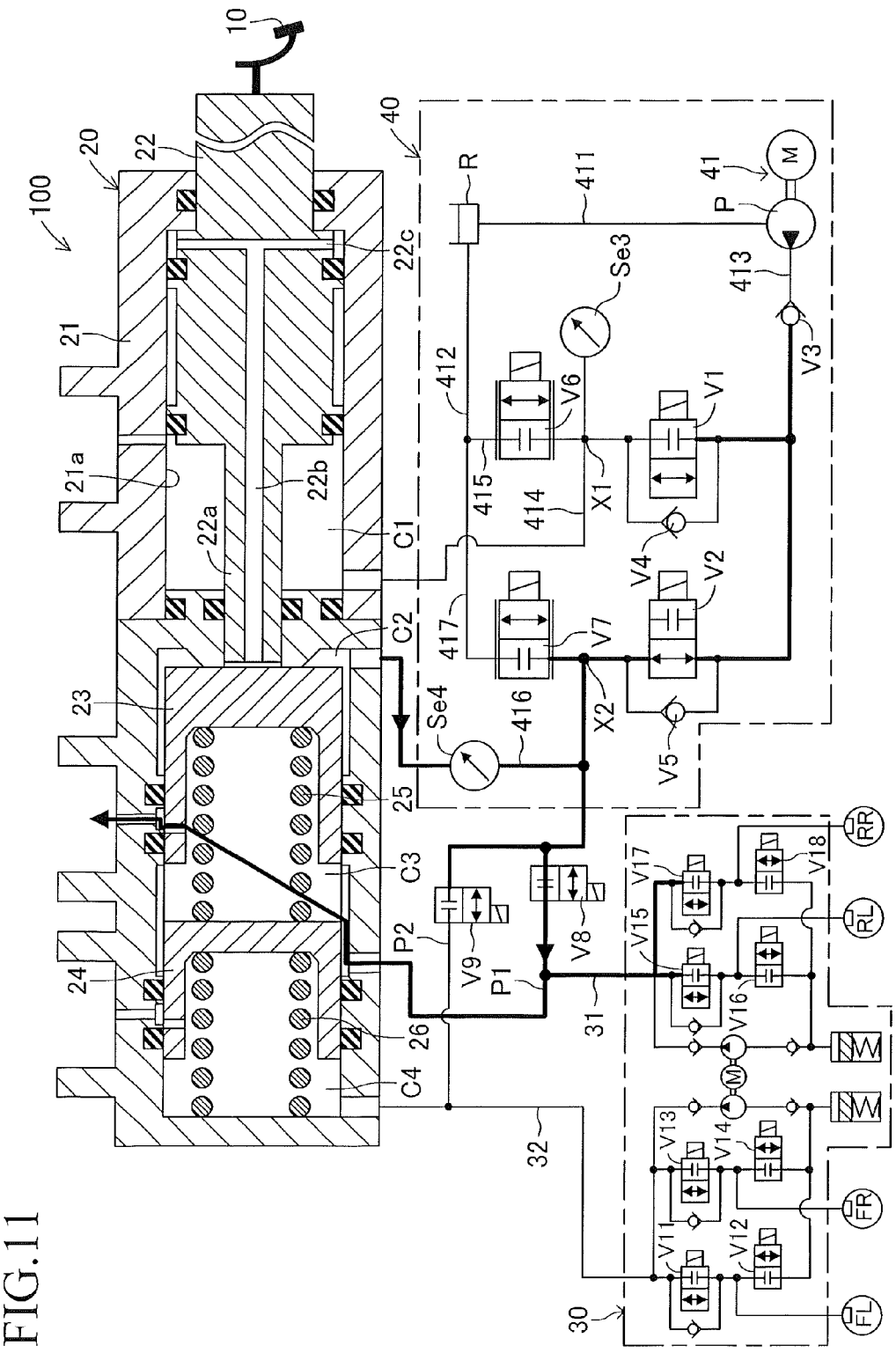
FIG. 11 is a partial configuration diagram corresponding to FIG. 2, for illustrating a state in which a leak (seal abnormality) occurs on the first normally closed electromagnetic open/close valve when the second action check program of FIG. 8 is executed.

Moreover, in Step 306, in the state illustrated in FIG. 10, whether or not the working fluid is flowing from the drive fluid chamber C2 to the pressure chamber C3 via, for example, the normally closed electromagnetic open/close valve V8 (refer to FIG. 11), and is flowing from the pressure chamber C3 toward the reservoir R is determined based on whether or not the pressure Ps in the second supply path 416 detected by the pressure sensor Se4 is equal to or less than a predetermined value E. When the determination of "No" is made, Step 310 is carried out, and an abnormality notification (turning on a lamp) is carried out. Note that, from the state illustrated in FIG. 10, when the working fluid is flowing from the drive fluid chamber C2 to the pressure chamber C4 via the normally closed electromagnetic open/close valve V9, and is flowing from the pressure chamber C4 to the reservoir R, the same determination as the determination described above is also made.

Moreover, when, in Step 306, the determination of "Yes" is made, Step 307 and Step 308 are carried out. In Step 307, the first open/close valve V1 of the fluid-pressure control circuit 40 is brought into the non-action state (off state), and the respective selector valves V11, V13, V15, and V17 of the brake fluid-pressure control actuator 30 are also brought into the non-action state (off state), so that the master cylinder 20 and the fluid-pressure control circuit 40 return to the states illustrated in FIG. 1 via the states illustrated in FIG. 8.

Therefore, if the program is configured so that Step 308 is carried out at a timing when the state illustrated in FIG. 8 is brought about (that is, a step of delaying the execution of Step 308 by a required period of time is added between Step 307 and Step 308), a determination of "Yes" in Step 308 is a determination of the normality of the return action, and a determination of "No" in Step 308 is a determination of the abnormality of the return action. Note that, in Step 308, whether or not the working fluid is flowing from the drive fluid chamber C2 toward the reservoir R via the reaction force fluid chamber C1 is determined based on whether or not the pressure Ps in the second supply path 416 detected by the pressure sensor Se4 is equal to or less than a predetermined value F. When the determination of "No" is made, Step 310 is carried out, and an abnormality notification (turning on a lamp) is carried out. After the execution of Step 308 or Step 310, Step 309 is carried out, and the action check by the second action check program 300 is finished.

In summary, in the above-mentioned embodiment, when the action amount of the brake pedal 10 is equal to or more than the set value, both the electromagnetic open/close valves V8 and V9 are opened, and the working fluid can be supplied from the second supply path 416 of the fluid-pressure control circuit 40 to the respective master system fluid-pressure circuits 31 and 32 via the respective electromagnetic open/close valves V8 and V9 without stroking the respective master pistons 23 and 24. Therefore, a necessary amount of the working fluid required in the respective master system fluid-pressure circuits 31 and 32 (consumed fluid amount in the respective wheel cylinders FL, FR, RL, and RR) during the braking can be sufficiently secured by the working fluid supplied from the respective pressure chambers C3 and C4 of the master cylinder 20 to the master system fluid-pressure circuits and the working fluid (pressurized fluid) supplied from the fluid-pressure control circuit 40 to the respective master system fluid-pressure circuits 31 and 32 via the respective electromagnetic open/close valves V8 and V9. Thus, the size (diameter) and the stroke (stroke amount) of each of the master pistons can be reduced in this embodiment.

As a result, according to the embodiment, the physical dimensions of the master cylinder 20 can be reduced (for example, the effects due to the reduction in the size and the stroke of each of the master pistons 23 and 24 can be provided). Moreover, in the embodiment, the braking force can be increased by the reduction in the size (reduction in the diameter) of each of the master pistons 23 and 24 when the fluid-pressure control circuit 40 fails (when the master piston 23 is driven by being directly pushed by the input piston 22), as compared to a case in which the size of each of the master pistons 23 and 24 is not reduced.

Moreover, in the embodiment, the fluid-pressure brake device is configured so that the fluid pressure supplied to the drive fluid chamber C2 is added to the fluid pressure acquired in the pressure chambers C3 and C4 of the master cylinder 20 in order to increase the pressure. Thus, the number of types of master cylinders (20) can be reduced (that is, master cylinders can be used in common) even for a vehicle in which the consumed fluid amounts in the respective wheel cylinders (FL, FR, RL, and RR) are different from one another, by changing the working fluid amounts supplied from the fluid-pressure control circuit 40 to the respective master system fluid-pressure circuits 31 and 32 depending on the consumed fluid amounts in the respective wheel cylinders (FL, FR, RL, and RR).

Moreover, in the embodiment, for example, when the vehicle is started (in a non-braking stop state before a travel), the action checks (determination of normality/abnormality) for the fluid-pressure control circuit 40 and the normally closed electromagnetic open/close valves V8 and V9 can be carried out by executing the first action check program 200 illustrated in FIG. 4. Moreover, the action checks (determination of normality/abnormality in sealing) for the normally closed electromagnetic open/close valves V8 and V9 can be carried out by executing the second action check program 300 illustrated in FIG. 9. Note that, execution timings of the first action check program 200 and the second action check program 300 are not limited to the start of the vehicle (in the non-braking stop state before the travel), and can be any timing as long as the vehicle is stopped without braking.

In the embodiment, the fluid-pressure brake device is configured so that, when the action amount of the brake pedal 10 is equal to or more than the set value, independently of the action/non-action of the brake fluid-pressure control actuator 30, both the electromagnetic open/close valves V8 and V9 are opened. However, the fluid-pressure brake device can also be configured so that, when the brake fluid-pressure control actuator 30 is in action (ABS is in action), both the electromagnetic open/close valves V8 and V9 are closed. In this case, when the pressure is reduced by the ABS action, the working fluid drawn by the pump from the respective pressure chambers of the wheel cylinders FL, FR, RL, and RR is prevented from flowing to the reservoir R of the fluid-pressure control circuit 40 via both the electromagnetic open/close valves V8 and V9, and is returned to the pressure chambers C3 and C4 of the master cylinder 20. Therefore, when the pressure is increased by the ABS action, the working fluid returned to the pressure chambers C3 and C4 of the master cylinder 20 is supplied to the respective pressure chambers of the wheel cylinders FL, FR, RL, and RR. Thus, even if the pressure increase and the pressure reduction by the ABS action are repeated, the fluid amounts in the master system fluid-pressure circuits 31 and 32 do not decrease, and the master pistons 23 and 24 do not bottom out.

Moreover, in the above embodiment the fluid-pressure control circuit 40 has the configuration as illustrated in FIG. 1 (configuration including one electric fluid-pressure source (pump and motor) 41 and the four electromagnetic valves V1, V2, V6, and V7). However, in the embodiment of the present invention, the fluid-pressure control circuit only needs to have the configuration that includes the electric fluid-pressure source (pump and motor) and the electromagnetic valves, actions thereof being controlled by the electric control unit (50) depending on the action amount of the brake operation member (10), in which the electric fluid-pressure source can supply the working fluid to the reaction force fluid chamber and the drive fluid chamber, and the electromagnetic valves can independently control the fluid pressure in the reaction force fluid chamber and the fluid pressure in the drive fluid chamber. Thus, the numbers and configurations of the electric fluid-pressure source (pump and motor) and the electromagnetic valves can be appropriately changed. Moreover, in the above embodiment the case in which the brake fluid-pressure control actuator 30 is a recirculation actuator, but the present invention can be carried out even if the brake fluid-pressure control actuator is not the recirculation actuator.

The invention claimed is:
1. A fluid-pressure brake device for a vehicle comprising:
a master cylinder;
a fluid-pressure control circuit;
a master system fluid-pressure circuit; and
a normally closed electromagnetic open/close valve;
wherein said master cylinder comprises:
a cylinder body having a cylinder bore;
an input piston assembled to said cylinder bore of said cylinder body so as to be movable in a cylinder axial direction, so that the input piston forms a reaction force fluid chamber capable of supplying and discharging a working fluid to and from an inside of said cylinder body, said input piston being integrally drivable with a brake operation member; and
a master piston which is arranged coaxially with said input piston, and is assembled to said cylinder bore so as to be movable in said cylinder axial direction to form a drive fluid chamber capable of supplying and dis- charging said working fluid to and from said inside of said cylinder body and a pressure chamber capable of supplying and discharging said working fluid to and from said inside of said cylinder body, said master piston being driven by said input piston or said working fluid supplied to said drive fluid chamber, said master cylinder being configured so that a fluid pressure in said drive fluid chamber does not act on said input piston in said cylinder axial direction;

wherein said fluid-pressure control circuit comprises an electric fluid-pressure source and an electromagnetic valve, actions thereof being controlled by an electric control unit depending on an action amount of said brake operation member, said electric fluid-pressure source being capable of supplying said working fluid to said reaction force fluid chamber and said drive fluid chamber, said electromagnetic valve being capable of independently controlling a fluid pressure in said reaction force fluid chamber and said fluid pressure in said drive fluid chamber;

wherein said master system fluid-pressure circuit is configured to connect said pressure chamber of said master cylinder and a pressure chamber of a wheel cylinder with each other, wherein said normally closed electromagnetic open/close valve is interposed on a path connecting said master system fluid-pressure circuit and said drive fluid chamber with each other, and is configured to be opened when said action amount of said brake operation member is equal to or more than a set value, wherein said fluid-pressure brake device for a vehicle is configured so that when said electromagnetic open/close valve is opened, a fluid pressure supplied to said drive fluid chamber is added to a fluid pressure acquired in said pressure chamber of said master cylinder to thereby increase said fluid pressure.

2. The fluid-pressure brake device for a vehicle according to claim 1, further comprising a brake fluid-pressure control actuator, an action thereof being controlled depending on a slip state of a wheel, said brake fluid-pressure control actuator being interposed on said master system fluid-pressure circuit and being configured to control said fluid pressure supplied to said pressure chamber of said wheel cylinder, wherein said fluid-pressure brake device is configured so that, when said brake fluid-pressure control actuator is in action, said electromagnetic open/close valve is closed even when said action amount of said brake operation member is equal to or more than said set value.

* * * * *